US007181742B2

(12) United States Patent
Hooper (10) Patent No.: US 7,181,742 B2
(45) Date of Patent: Feb. 20, 2007

(54) ALLOCATION OF PACKETS AND THREADS (75) Inventor: Donald F. Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 10/300,066

(22) Filed: Nov. 19, 2002

(65) Prior Publication Data

US 2004/0098720 A1 May 20, 2004

(51) Int. Cl.
G06F 9/46 (2006.01)
(52) U.S. Cl. ............... 718/100; 718/101; 718/102; 718/106; 719/310
(58) Field of Classification Search ........... 718/106, 718/100, 101, 102, 107, 108; 709/207; 719/310; 710/1, 20
See application file for complete search history.

(56) References Cited

U.S. PATENT DOCUMENTS

| 6,836,808 B2 * | 12/2004 | Bunce et al. ............ 710/20 |
| 2003/0043803 A1 | 3/2003 | Hooper |
| 2003/0046517 A1 * | 3/2003 | Lauterbach ............ 712/214 |
| 2003/0067934 A1 | 4/2003 | Hooper et al. |
| 2003/0110166 A1 | 6/2003 | Woolrich et al. |
| 2003/0163589 A1 * | 8/2003 | Bunce et al. ............ 709/250 |
| 2003/0188141 A1 * | 10/2003 | Chaudhry et al. ........ 712/235 |
| 2003/0236919 A1 * | 12/2003 | Johnson et al. ........ 709/251 |
| 2004/0052269 A1 | 3/2004 | Hooper et al. |
| 2004/0059828 A1 | 3/2004 | Hooper et al. |
| 2004/0085901 A1 | 5/2004 | Hooper et al. |

OTHER PUBLICATIONS

INTEL: Design Document; MicroACE; 2001, Revision 1.0; pp. 1-39.
INTEL: Advanced IXP1200 Microengine Programming; IXP1200 Network Processor IDF Spring 2001; 44 pages.
Intel WAN/LAN Access Switch Example Design for the Intel IXP1200 Network Processor; Aplication Note; May 2001; Order No. 273528-001; 20 pages.
IXP1200 Network Processor; Microengine C RFC 1812 Layer 3 Forwarding Example Design; Application Note; Sep. 2001, Order No. 278440-001; 13 pages.
Intel IXP1200 Network Processor Macro Library Style Guide; Jun. 2001; pp. 1-1 to 1-8.
WZN/LAN Access Switch Example Design for the Intel IXP1200 Network Processor; product brief; 2001; Order No. 279044-001; 4 pages.
ATM/OC-3 to Fast Ethernet IP Router Example Design; product brief; 2001; Order No. 279046-001; 4 pages.
Adiletta et al: The Next Generation of Intel IXP Network Proccessors; Intel Technical Journal vol. 6, Issue 3, Aug. 15, 2002; 20 pages.
Intel IXP1200 Network Processor Family; Hardware Ref. Manual; Aug. 2001; Part No. 278303-008; pp. 17-49 + cover sheet.

(Continued)

*Primary Examiner*—William Thomson
*Assistant Examiner*—Andy Ho
(74) *Attorney, Agent, or Firm*—Robert A. Greenberg (57) ABSTRACT

The disclosure includes description of a method of processing packets using threads. The method includes processing a packet by a single thread in a first packet processing pipeline stage and processing the packet by multiple threads in a second packet processing pipeline stage.

26 Claims, 5 Drawing Sheets

| | timeslice | 1 | 2 | 3 | 4 | 5 | 6 | |
|---|---|---|---|---|---|---|---|---|
| thread 0: packet 0 | thread 0: packet | 0/1 | 0/1 | 0/1 | 0/1 | 0/1 | 0/1 | thread 0: packet 0 |
| thread 1: packet 1 | thread 1: packet | 0 | 0 | 0 | 1 | 1 | 1 | thread 1: packet 1 |
| thread 2: packet 2 | thread 2: packet | 2/3 | 2/3 | 2/3 | 2/3 | 2/3 | 2/3 | thread 2: packet 2 |
| thread 3: packet 3 | thread 3: packet | 2 | 2 | 2 | 3 | 3 | 3 | thread 3: packet 3 |
| stage 1 | stage 2 | | | | | | | stage 3 |
| 110a | 110b | | | | | | | 110c |

OTHER PUBLICATIONS

Johnson et al: IXP1200 Programming; The Microengine Coding Guide for the Intel Network Processor Family; pp. 55-97 + cover sheet.

Intel IXP Network Processor; Software Ref. Manual; Mar. 2000; Order No. 278306-003; pp. 3-1 to 3-30 + cover sheet.

Gwennap et al; A Guide to Network Processors, 2nd Ed.; Nov. 2001; 16 pages.

Shah: Understanding Network Processors, Version 1.0; Sep. 4 2001; pp. i-iii, 1-89 + cover sheet.

* cited by examiner

ALLOCATION OF PACKETS AND THREADS

BACKGROUND

Networks enable computers and other devices to exchange data such as e-mail messages, web pages, audio, video, and so forth. To send data across a network, a sending device typically constructs a collection of packets. Individual packets store some portion of the data being sent. A receiver can reassemble the data into its original form after receiving the packets Network devices receiving packets perform a wide variety of operations. For example, some devices, known as routers and switches, examine packets to determine how to forward the packet further on a path toward its destination. Other devices, known as firewalls, examine packets to identify those that may pose a security risk. Due to continuing increases in network connection speeds and the volume of network traffic, network devices perform their operations at increasing speeds.

Many different hardware and software schemes have been developed to handle packets. For example, some designs use software to program a general purpose Central Processing Unit (CPU) processor to process packets. Other designs, such as designs using components known as application-specific integrated circuits (ASICs), feature dedicated, "hard-wired" approaches.

To combine the programmable flexibility of a CPU with the speed often associated with an ASIC, many vendors sell programmable devices known as network processors. Network processors enable software programmers to quickly reprogram network processor operations. Currently, network processors can be found in a variety of network systems including routers, switches, firewalls, line cards, and storage area network (SAN) components, among others.

DETAILED DESCRIPTION

Figure 1:
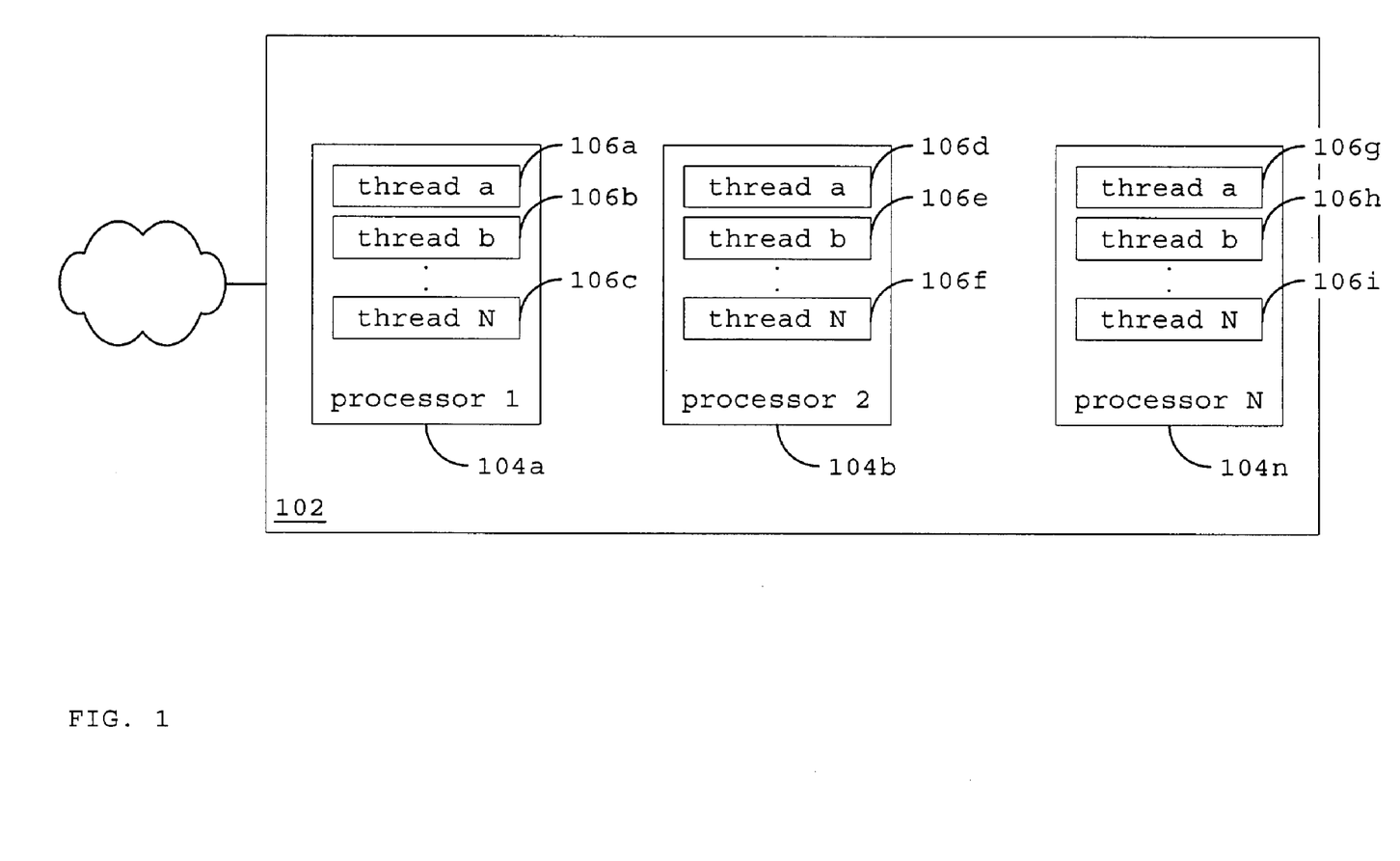
FIG. 1 is a diagram of a multi-threaded packet processing system.

FIG. 1 depicts an example of a network system 102 that processes packets using multiple threads 106. The threads 106 can perform a wide variety of packet processing operations such as tasks involved in packet classification, packet verification, and/or packet forwarding. This disclosure describes techniques for allocating packets and threads in ways that can potentially improve the performance of a network system.

In greater detail, the sample system 102 shown in FIG. 1 features a set of processors 104 providing packet processing threads 106. A thread 106 is a set of computer instructions with an independent flow of control. A processor (e.g., processor 104a) may be programmed or designed to execute instructions for a limited number of threads 106 (e.g., 1) at a given time. To provide individual threads 106a–106c with some execution time, a processor 104a can "juggle" between different threads. That is, the processor 104a can switch between threads by saving context data (e.g., instruction counter and status flags) for a currently active thread and retrieving thread context data of another thread. The processor 104a can then resume execution of the newly activated thread where previous execution left off. A processor 104a may use a wide variety of scheduling algorithms to determine which thread to execute at a given time. For example, a processor 104a may use a round-robin schedule that provides each thread 106a–106n with a slice of execution time in turn.

A thread 106 may perform one or more of a wide variety of packet processing operations. These operations can include, for example, a determination of a packet's arrival port, a determination of the quality of service associated with a packet, a determination of the link layer type of the packet (e.g., Asynchronous Transfer Mode (ATM), Ethernet, or Frame Relay), the network layer type (e.g., Internet Protocol (IP), Address Resolution Protocol (ARP), or Internet Control Message Protocol (ICMP)), and/or the transport layer type (e.g., Transmission Control Protocol (TCP), User Datagram Protocol (UDP)). Operations also may include a variety of lookups such as a table lookup to determine an output interface or port for a next network hop or lookups that identify policies or filters indicating how to handle or discard a packet.

Figure 2:
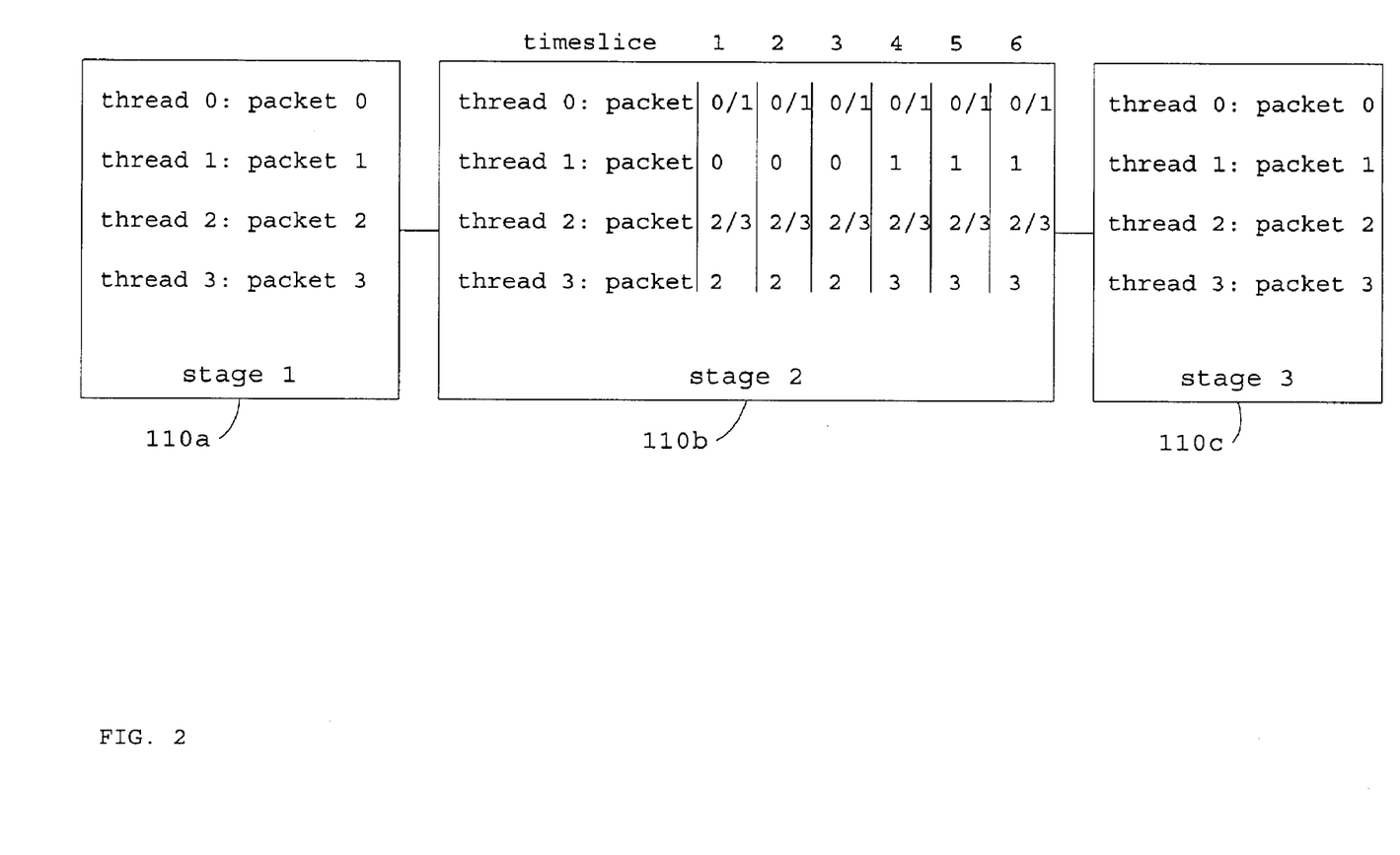
FIG. 2 is a diagram illustrating packet/thread allocation.

FIG. 2 illustrates a sample allocation of packets to threads. Potentially, the different sets 110 of threads may act concurrently on a set of packets. As shown, however, the different sets 110 of threads may instead form stages of a packet processing pipeline where a stage 110a–110c provides packet processing results to following stages which continue processing operations. For example, threads in a first stage 110a may perform tasks such pulling a packet from a receive queue, allocating memory for the packet, storing the packet in the allocated memory, and extracting the packet header. A first stage 110a thread may then pass the extracted header and a pointer to the packet in memory to the second stage 110b for further processing. Threads in the second stage 110b can then perform header checks such as verifying the packet length, time-to-live, and checksum, and checking for illegal addresses. The second stage 110b can also perform a lookup of a packet's destination address. The second stage can pass the results of header verification and the lookup to the third stage 110c. The third stage 110c can use the lookup results to classify the packet (e.g., determine forwarding information) and/or queue the packet for forwarding.

Though shown as having three sets 110a–c of threads, other implementations may have a different number of sets 110a–c. Additionally, though individual sets 110 are illustrated as having four threads, other implementations may feature different numbers of threads. Similarly, different sets 110a–c of threads need not feature the same number of threads.

As shown in FIG. 2, a set of packets may be allocated for processing by the threads in a variety of ways. For example, in the first 110a and third 110c set of threads, each thread processes a different packet in the set of packets and a given packet is processed by only one of the threads. Thus, as shown, for a set of received packets 0, 1, 2, and 3, thread 0 of the first set 110a of threads processes packet 0, thread 1 processes packet 1, thread 2 processes packet 2, and thread 3 processes packet 3. As shown, the threads may operate in parallel. That is, while thread 0 is processing packet 0, thread 1 is processing packet 1.

In the second set of threads 110b, however, individual threads process multiple packets from the set of packets and a packet is processed by multiple threads. For example, thread 0 processes packets 0 and 1, thread 1 processes packets 0 and 1, thread 2 processes packets 2 and 3, and thread 3 processes packets 2 and 3.

In FIG. 2, an example of the packets processed by threads in the second stage 110*b* in each of six different time slices is shown. For example, thread 0 processes packets 0 and 1 in a first time slice while thread 3 processes packet 2 in the same time slice. Thus, as illustrated, the threads in the second set 110*b* vary in the sequence in which they process packets. For example, even threads 0 and 2 interleave processing of packets. For instance, thread 0 operates on packet 0, then packet 1, then resumes processing of packet 0, resumes processing of packet 1, and so forth. Odd threads 1 and 3, however, complete their operations on one packet before turning to the next. For example, thread 1 finishes its operations on packet 0 before beginning operations for packet 1. Like the first 110*a* and third 110*c* sets of threads, threads in the second set 110*b* may operate in parallel.

As illustrated by FIG. 2, a packet may be processed by varying number of threads based on the stage 100. The design of how many threads process a given packet and the manner (e.g., interleaved or continuous) in which the threads are processed may depend, for example, on the processing tasks performed by a thread.

Figure 3:
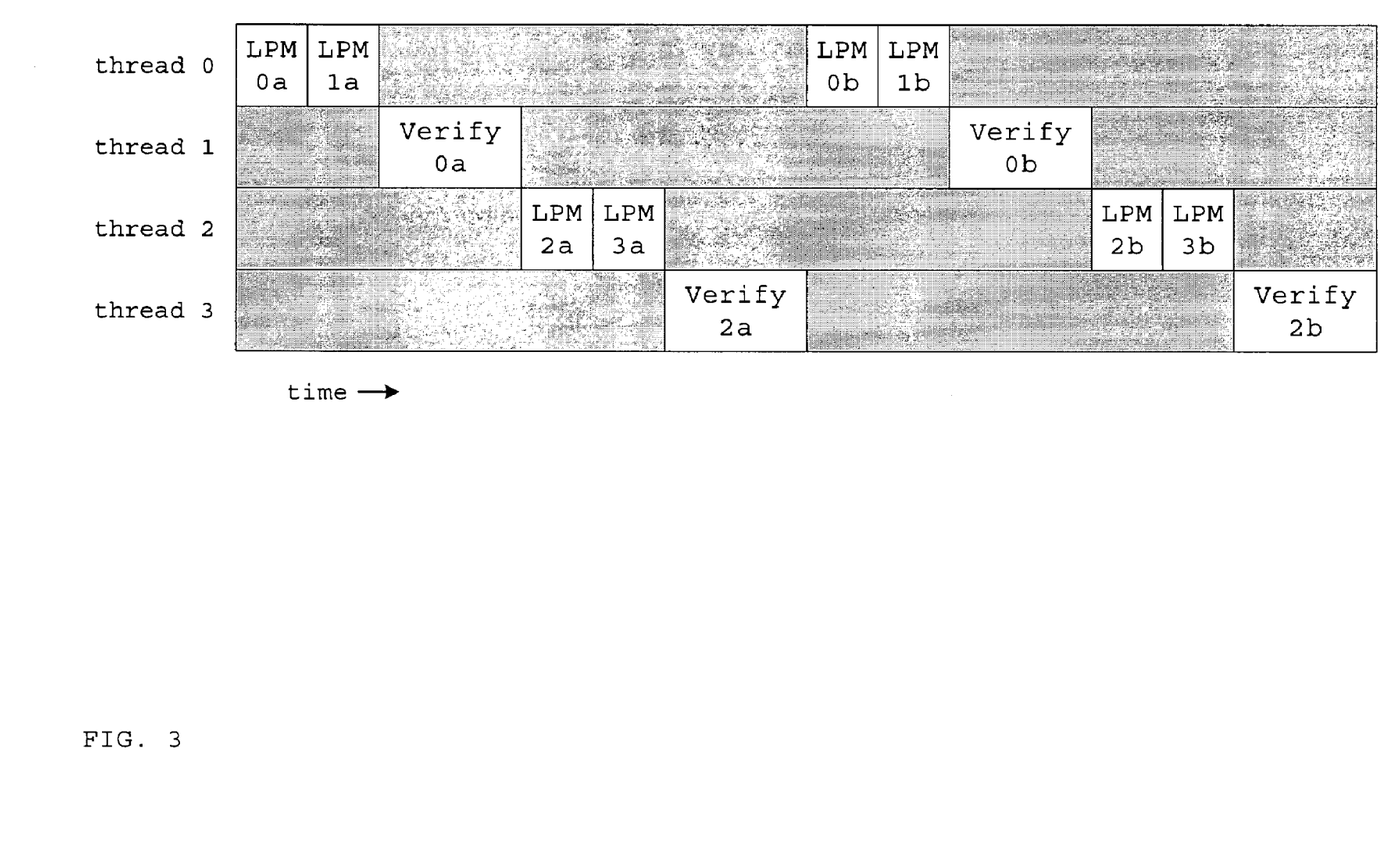
FIG. 3 is a diagram illustrating packet processing operations performed by a set of threads.

For example, FIG. 3 illustrates operations performed by a set of threads (e.g., the second set of threads 110*b* in FIG. 2). In this example, the threads are executed by the same processor and receive an execution time-slice in turn. After a time-slice, a thread hibernates until its next slice (shown as a shaded portion within a thread's timeline).

As shown, different threads within the set of threads perform different packet processing operations in parallel. For example, threads 1 and 3 perform header verification. For instance, these threads may analyze a packet to verify that the Ethernet destination address of the packet matches the Ethernet address of the receiving device and that a checksum included in the packet is correct. These threads may also identify packets addressed to "martian" network addresses that should not be forwarded. As shown, the verification process may not be finished in a single time-slice. For example, thread 1 verifies packet 0 in two different time slices "Verify 0*a*" and "Verify 0*b*". After completing verification of packet 0, thread 1 verifies packet 1 (not shown).

While threads 1 and 3 verify packets, threads 0 and 2 perform longest prefix matching (LPM) on a packet's network address. Briefly, longest prefix matching is often used to determine the next "hop" for a packet. For example, routing tables often include entries that designate the next hop for a particular destination address. Routing tables also feature entries that designate the next hop for a range of destination address (e.g., packets within the range of address may be forwarded to the same device). These different entries may overlap. For example, the table may include an entry for a broad range of addresses and more specific entries for addresses within the broad range that should be handled differently. Longest prefix matching, in essence, searches for the most specific table entry for a packet's address.

Longest prefix matching may be implemented in a wide variety of ways. For example, a system may use a binary search to progressively narrow a search of a routing table to identify a match. Other matching systems use a data structure known as a "trie" to perform address lookups. A trie is a collection of tables where different tables correspond to different portions of a network address. For example, a root level trie table may include entries for the first 16-bits of a 32-bit Internet Protocol (IP) address, a second tier of trie tables may include entries for the next four bits (bits 17–21), and so forth. A trie entry can either identify a match or, when multiple entries share the same set of bits, the entry can refer to another trie table covering a different portion of the address being searched for. To speed retrieval, multiple trie entries may be stored for a routing entry (e.g., a routing entry of "192.12.160.5/24" may result in entries for addresses ranging from "192.12.160.0" to "192.12.160.255"). Additionally, a system may search different tries simultaneously. For example, a system may search a trie with a 16-bit root and a trie with an 8-bit root and terminate searching when one yields a match.

As illustrated by the sample techniques described above, longest prefix matching often involves multiple memory access requests. Since a memory access takes some time, a thread may idly wait for the results of memory request. During this wait, the thread may consume processing time that could be used by other threads or to perform other operations. In the example shown in FIG. 3, to potentially reduce processor idling, the even threads 0 and 2 interleave operations on different packets. For example, after making a memory access request for packet 0 as part of a LPM search for packet 0's destination address (e.g., a search of a trie table), thread 0 makes a memory access request for packet 1 in the same time-slice. By the next time slice, the results of the memory access requests may have completed. This pattern may repeat until the longest prefix matching for both packets completes. In such a scheme, the time-slice may be configured as the memory-latency-time/number-of-threads.

Thus, as illustrated above, allocating multiple packets to a thread can potentially permit a thread to more efficiently use processor resources. Additionally, allocating a packet to multiple threads in a stage can permit a processor to perform different operations in parallel. However, in some circumstances, the allocation techniques illustrated in FIG. 2 may be unnecessarily complex. Thus, the single thread to packet allocation of stages 1 110*a* and 3 110*c* may be more suitable.

Figure 4:
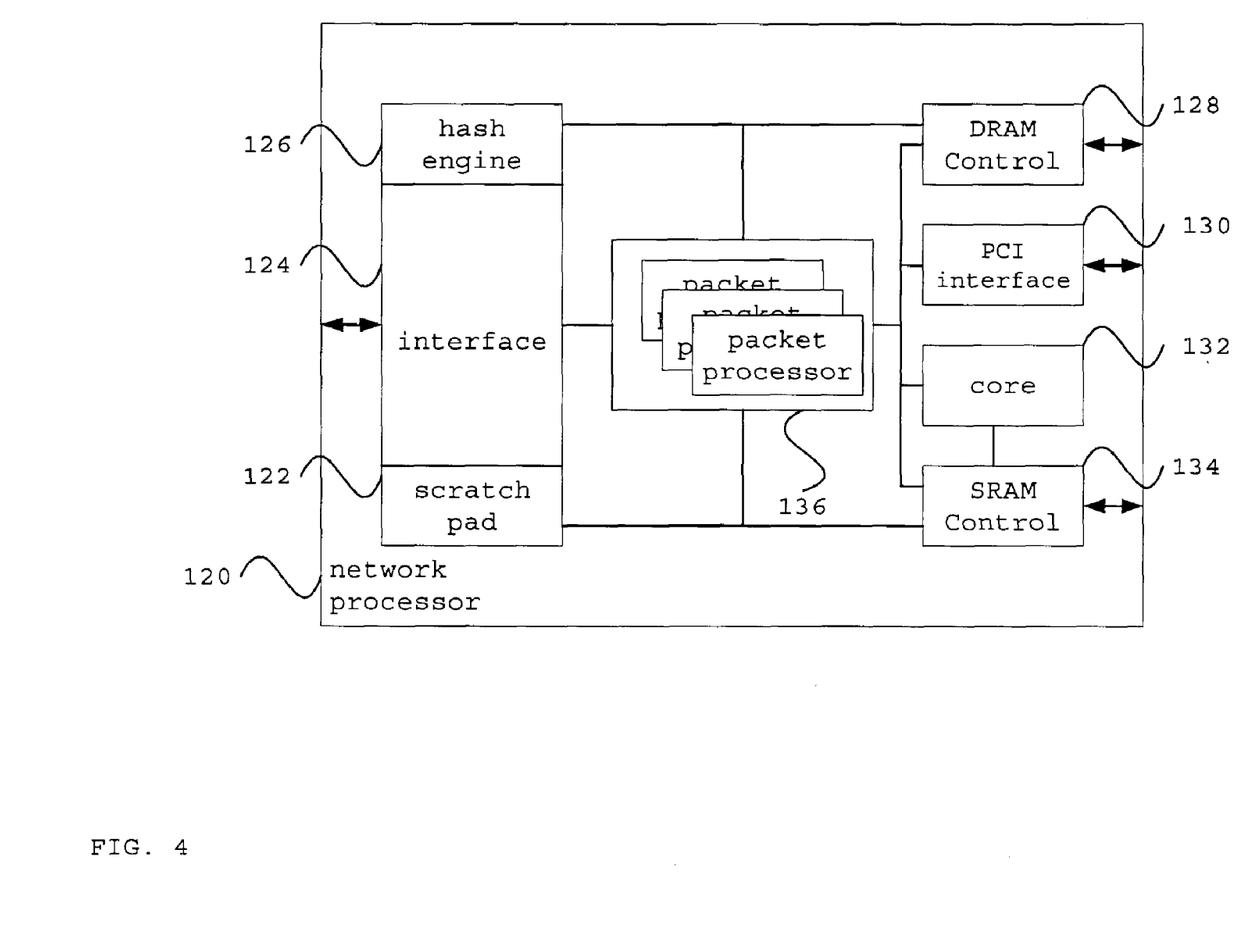
FIG. 4 is a diagram of a network processor.

The techniques described above may be used in a wide variety of systems. For example, FIG. 4 depicts a network processor 120 that features multiple processors 136, 132. The processor 120 shown is an Intel® Internet eXchange network Processor (IXP). Other network processors feature different designs.

As shown, the processor 120 features an interface 124 (e.g., an Internet eXchange bus interface) that can carries packets between the processor 120 and a network, for example, via a switch fabric. The processor 120 also includes an interface 130 for communicating with a host or other local devices. Such an interface may be a Peripheral Component Interconnect (PCI) type interface such as a PCI-X bus interface. The processor 120 also includes other components such as memory controllers 128, 134, a hash engine 126, and scratch pad memory 122.

The processor 120 shown features a collection of packet processors 136. In the network processor 120 shown, the packet processors 136 are Reduced Instruction Set Computing (RISC) processors tailored for processing network packets. For example, the packet processors do not include floating point instructions or instructions for integer multiplication or division commonly provided by general purpose central processing units (CPUs). Individual packet processors 136 feature a collection of "neighbor registers" connected to adjacent packet processors 136 that permit fast communication between neighboring packet processors 136.

An individual packet processor 136 offers multiple threads. The multi-threading capability of the packet processors 136 is supported by context hardware that reserves different general purpose registers for different threads and can quickly swap instruction and status data for the different threads between context registers and context storage.

The processor 120 also includes a core processor 132 (e.g., a StrongARM® XScale®) that is often programmed to perform "control plane" tasks involved in network operations. The core processor 132, however, may also handle "data plane" tasks and may provide additional packet processing threads.

The network processor 120 may implement the techniques described above in a variety of ways. For example, a given set of threads may be provided by one or more particular packet processors 136. For example, the first set of threads 110a shown in FIG. 2 may be the threads of one packet processor, the second set of threads 110b may be the threads of a different packet processor, the third set of threads 110c may be the threads of yet another packet processor, and so forth.

In such an implementation, the threads of one stage may communicate with threads of another stage via the packet processor neighbor registers. For example, the results of the first set of threads may be placed in neighbor registers of the packet processor(s) that provide the second set of threads. The processors 136 may organize the memory provided by the neighbor registers into a messaging ring. A preceding stage queues a message into its neighbor processor for reading by a thread on the neighbor processor.

The stages can coordinate message queuing such that messages are retrieved by the correct thread. For example, in FIG. 1, the first stage 110a threads may successively insert messages for packet 0, packet 1, packet 2, and packet 3 in a message queue for the second stage 110b after completing first stage operations. Thread 0 of the second stage 110b reads the top two messages (e.g., for packet 0 and packet 1). Thread 1 of the second stage 110b then reads and deletes the same two messages. Thread 2 of the second stage 110b then reads the top two messages (e.g., now packet 2 and packet 3) and thread 3 reads and deletes the messages.

A wide variety of other techniques may be used to communicate between and within stages. For example, a thread may write multiple messages to be read by different threads. Additionally, a thread may make information available to other threads in a stage, for example, by storing data in memory accessible by the other threads. For instance, thread 0 of stage two 110b may make store data for packets also being processed by thread 1 of stage two 110b in commonly accessible memory. Potentially, the threads may be enumerated. That is, a thread may know whether it is an even or odd thread. The threads may use this enumeration to determine which packets to process and how to process them.

Figure 5:
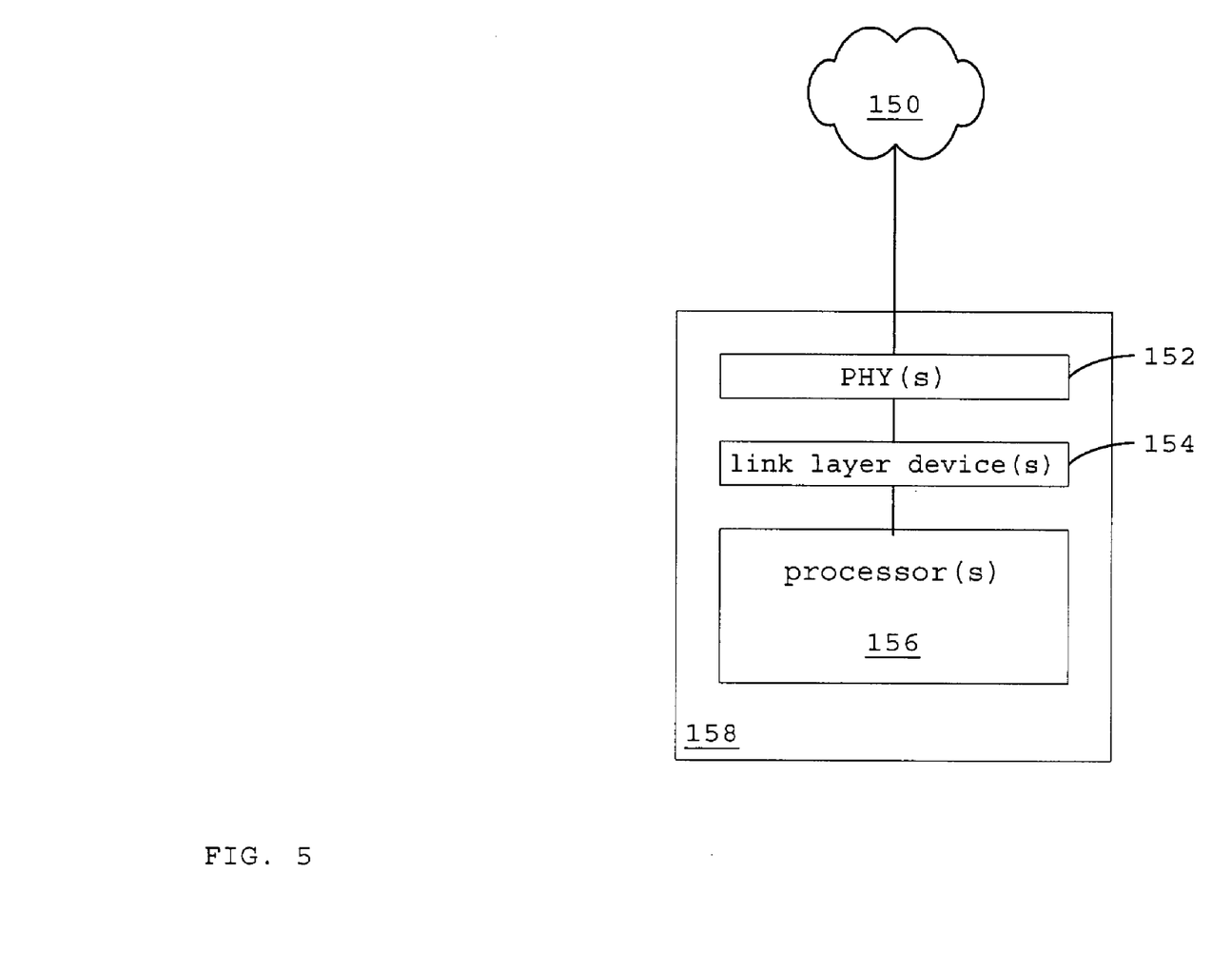
FIG. 5 is a diagram of a network device.

FIG. 5 depicts a network device 158 that can implement the packet allocation techniques described above. As shown, the network device 158 features one or more processors 156 offering a collection of packet processing threads. The processors 156 communicate with a network 150 via one or more physical layer (PHY) devices 152 (e.g., devices handling copper, optical, and wireless transmission mediums) and link layer 154 (e.g., Ethernet medium access control (MAC) devices, SONET framers, and so forth) devices. The device 158 maybe programmed or designed to perform a wide variety of network duties such as routing, switching, bridging, acting as a firewall, and so forth. The device 158 may communicate with a host (not shown). For example, the device 158 may be integrated with a personal computer having a host processor and host memory as a network interface card (NIC) or Transfer Control Protocol/Internet Protocol Off-Load Engine (TOE).

While described as applying to Internet Protocol packets, the techniques described above may be used for a variety of schemes (e.g., Asynchronous Transfer Mode (ATM)). Additionally, while examples featured the 32-bit IP addresses of IPv4, the techniques may also be used with the larger addresses of IPv6.

The techniques described herein may have applicability in a wide variety of multi-threaded environments. The techniques may be implemented in hardware, software, or a combination of the two. For example, the techniques may be implemented by programming a network processor or other multi-threaded processing system. The programs may be disposed on computer readable mediums and include instructions for causing processor(s) to use the techniques described above.

Other embodiments are within the scope of the following claims.

What is claimed is:

1. A method of processing packets, the method comprising:
   processing a packet by a single thread of threads in a first packet processing pipeline stage;
   processing the packet by multiple threads of threads in a second packet processing pipeline stage;
   wherein at least one of the threads in the first packet processing pipeline stage or the second packet processing pipeline stage comprises a thread to simultaneously perform address lookups for multiple packets in an interleaved sequence;
   wherein the threads in the first packet processing pipeline stage comprise threads of a first set of at least one processor and the threads in the second packet processing pipeline stage comprise threads of a second set of at least one processor, the second set of at least one processor having a different set of processors than the first set.

2. The method of claim 1, wherein at least one of the threads performs packet header verification.

3. The method of claim 1, wherein the first and second set of processors communicate via neighbor registers.

4. The method of claim 1, wherein the first pipeline stage precedes the second pipeline stage.

5. The method of claim 1, wherein the first pipeline stage follows the second pipeline stage.

6. The method of claim 1, wherein the multiple threads comprise multiple threads operating in parallel.

7. The method of claim 1, wherein the multiple threads comprise threads that perform different packet processing operations.

8. A method of processing packets, the method comprising:
   executing a thread of threads in a first packet processing pipeline stage to process a single packet in a set of packets; and
   executing a thread of threads in a second packet processing pipeline stage to simultaneously process more than one packet in the set of packets in a interleaved sequence;
   wherein the threads in the first packet processing pipeline stage comprise threads of a first set of at least one processor and the threads in the second packet processing pipeline stage comprise threads of a second set of at least one processor having a different set of processors than the first set.

9. The method of claim 8, wherein at least one of the threads performs packet header verification.

10. The method of claim 8, wherein the first pipeline stage precedes the second pipeline stage.

11. The method of claim 8, wherein the first pipeline stage follows the second pipeline stage.

12. The method of claim 8, wherein the thread in the second set of threads interleaves processing of the more than one packets.

13. A system, comprising:
    an interface to receive data of a set of packets;
    at least one processor, the at least one processor providing multiple threads, the threads including a first set of threads in a first stage of a packet processing pipeline and a second set of threads in a second stage of the packet processing pipeline, a single thread of the threads in the first packet processing pipeline stage to process a one of the set of packets, and multiple threads of threads in the second packet processing pipeline stage to process the one of the set of packets, wherein at least one of the threads in the first packet processing pipeline stage or the second packet processing pipeline stage comprises a thread to simultaneously perform address lookups for multiple packets in an interleaved sequence;
    wherein the at least one processor comprises multiple processors.

14. The system of claim 13, wherein at least one of the threads performs packet header verification.

15. The system of claim 13, wherein the first pipeline stage precedes the second pipeline stage.

16. The system of claim 13, wherein the first pipeline stage follows the second pipeline stage.

17. A system, comprising:
    an interface to receive data of a set of packets;
    at least one processor, the at least one processor providing multiple packet processing threads, the threads including a first set of threads in a first stage of a packet processing pipeline and a second set of threads in a second stage of the packet processing pipeline, a thread of threads in the first packet processing pipeline stage to process one packet in a set of packets and a thread of threads in the second packet processing pipeline stage to simultaneously process more than one packet in the set of packets in an interleaved sequence;
    wherein the at least one processor comprises multiple processors;
    wherein the first set of threads comprises a set of threads provided by a first of the multiple processors and wherein the second set of threads comprises a set of threads provided by a second of the multiple processors.

18. The system of claim 17, wherein at least one of the threads performs at least one of the following operations: header verification and a lookup of an address included in the packet.

19. The system of claim 17, wherein the first pipeline stage precedes the second pipeline stage.

20. The system of claim 17, wherein the first pipeline stage follows the second pipeline stage.

21. A system, comprising:
    at least one physical layer (PHY) device;
    at least one Ethernet medium access control (MAC) device coupled to the at least one PHY; and
    multiple processors coupled to the at least one MAC device, the multiple processors providing multiple packet processing threads, the threads including a first set of threads in a first stage of a packet processing pipeline and a second set of threads in a second stage of the packet processing pipeline, the first set of threads provided by at least a first of the multiple processors and the second set of threads provided by at least a second of the multiple processors, the first set of threads to process a packet in a set of packets using a single thread and the second set of threads to process the packet using multiple threads, a thread of threads in the second set of threads to simultaneously perform address lookups for more than one packet in the set of packets in an interleaved sequence.

22. The system of claim 21, wherein the first pipeline stage precedes the second pipeline stage and wherein the first pipeline stage communicates with the second pipeline stage by placing a message in a message queue accessed by the second pipeline stage.

23. The system of claim 21, wherein the second pipeline stage precedes the first pipeline stage and wherein the second pipeline stage communicates with the first pipeline stage by placing a message in a message queue accessed by the first pipeline stage.

24. The system of claim 21, wherein the packet processing threads perform at least one of the following operations: header verification and a loakup of an address included in a packet.

25. A computer program product, disposed on a computer readable medium, including instructions for causing one or more processors to:
    process a set of packets using threads, the threads including a first set of threads in a first stage of a packet processing pipeline and a second set of threads in a second stage of the packet processing pipeline, the first set of threads to process a packet in a set of packets using a single thread and the second set of threads to process the packet using multiple threads, a thread of threads in the second set of threads to simultaneously process more than one packet in the set of packets in an interleaved sequence, wherein the threads in the first packet processing pipeline stage comprise threads of a first set of at least one processor and the threads in the second packet processing pipeline stage comprise threads of a second set of at least one processor, the second set of at least one processor having a different set of processors than the first set.

26. The program product of claim 25, wherein at least one of the threads performs packet header verification.

* * * * *